United States Patent [19]
Summers

[11] 3,834,043
[45] Sept. 10, 1974

[54] ART INSTRUCTING APPARATUS
[76] Inventor: C. Elwood Summers, 8325 Riverland Dr., Sterling Heights, Mich. 48078
[22] Filed: Aug. 3, 1973
[21] Appl. No.: 385,506

[52] U.S. Cl. .................................... 35/26, 33/77
[51] Int. Cl. ........................................ G09b 11/00
[58] Field of Search ........... 35/26; 33/20 C, 77, 277

[56] References Cited
UNITED STATES PATENTS

| | | | |
|---|---|---|---|
| 224,945 | 2/1880 | O'Ryan | 35/26 |
| 1,150,550 | 8/1915 | Snyder | 35/26 |
| 1,210,608 | 1/1917 | Dannenfelser | 35/26 |
| 2,571,613 | 10/1951 | Rissland | 35/26 |
| 3,660,903 | 5/1972 | Caperton | 35/26 X |

FOREIGN PATENTS OR APPLICATIONS

| | | | |
|---|---|---|---|
| 1,208,505 | 1/1966 | Germany | 33/277 |

*Primary Examiner*—Harland S. Skogquist
*Attorney, Agent, or Firm*—Reising, Ethington & Perry

[57] ABSTRACT

This art instructing apparatus allows the art student to compose his own three dimensional scene for reproduction in two dimensional form. The apparatus affords particular assistance to the student in the handling of perspective views. The rate at which the three dimensional scene recedes from the foreground to vanishing points in the background is graphically defined by four elastic cords attached to a pair of spring clips carried by two vertical rods at the rear of the apparatus and to a figure model, which serves as a foreground art object. An elastic cord extends from each spring clip to the top of the foreground figure model, and an elastic cord extends from each spring clip to the bottom of the foreground figure model. The spring clips can be vertically positioned on the rods to set the vertical position of the horizon relative to the foreground figure model. The horizontal separation of the vertical rods is also adjustable to adjust the rate at which the perspective lines, defined by the four elastic cords, approach the vanishing points. Additional figure models are provided for attachment to the elastic cords such that a three dimensional scene, including both foreground and background figures, can be composed. A transparent grid is provided at the front of the apparatus to assist the student in reproducing the proportions of the various models. The foreground figure model stands on a magnetic base or pedestal which can be selectively positioned on the base of the apparatus to provide the art student maximum flexibility in composing the three dimensional scenes he wishes to reproduce. This art instructing apparatus is designed for easy disassembly so it can be conveniently and compactly transported.

18 Claims, 3 Drawing Figures

ART INSTRUCTING APPARATUS

BACKGROUND OF THE INVENTION

1. Field of the Invention

This invention relates to an art instructing apparatus which allows art students to compose three dimensional perspective scenes for reproduction in two dimensional forms.

2. Description of the Prior Art

Apparatus to assist art students develop their drawing techniques are well-known in the art. An early example of such an apparatus is shown in the Patent to Peabody U.S. Pat. No. 228,273 which issued in 1880. The emphasis of prior art art instructing apparatus is typified by the Peabody apparatus with its grid to assist art students in determining the proportions of art objects. Numerous subsequent patents, such as the patent to Woods U.S. Pat. No. 1,821,252 and the patent to Richards U.S. Pat. No. 2,401,105, provide variations and refinements on this basic theme of the Peabody patent.

As illustrated in these patents, the basic approach in the prior art involves a grid overlay of the art object to provide reference points for use in reproducing the art object on paper provided with a correlative grid. This approach gives instruction in the techniques of proper proportions, but it ignores important three dimensional problems and the difficulties attendant the reproduction of three dimensional scenes including perspective lines. Naturally, three dimensional scenes and the attendant perspective effects are incidentally involved in certain drawing apparatus of the prior art, such as, for example, the apparatus of Woods and that of the patent to Fall U.S. Pat. No. 666,415. The prior art, however, does not provide the student flexibility in the composition of three dimensional scenes and in the regulation of perspective lines, but rather leaves the art student at the mercy of the scenes available to him.

SUMMARY OF THE INVENTION

In the present invention a rigorous approach is provided for instructing art students in the techniques of reproducing three dimensional scenes, including instruction in the problems attendant perspective lines. This is accomplished by providing an entire three dimensional scene, complete with perspective lines, as a part of the art instructing apparatus. Natural background scenes, and other available scenes, are not relied upon for the three dimensional effect composed in this apparatus. This approach insures uniform instruction to the art student as he confronts the problems of three dimensions and perspective lines.

With the instant art instructing apparatus the art student user can compose three dimensional scenes in which the horizon, or vanishing points for the perspective lines, are vertically adjustable relatively to the foreground of the scene. Further, the rate at which the perspective lines approach the vanishing points can be adjusted by the user. These features of the apparatus, wholly unavailable in natural three dimensional scenes, give maximum flexibility and utility to the apparatus in the learning process of the art student.

The apparatus includes four elastic cords serving as perspective lines extending from the foreground of the scene to vanishing points in the background of the scene. The elastic cords extend between two spring clips carried by two vertical rods at the rear of the apparatus and a figure model which the student can selectively position toward the front of the apparatus, which figure model serves as a foreground art object for the three dimensional scene composed by the student. The foreground figure model includes a magnetic pedestal or base which can be selectively positioned on a ferromagnetic overlay of the base of the apparatus. The two rods at the rear of the apparatus are secured to horizontally extensible members such that the horizontal separation of the rods can be adjusted by the student when he composes the scene. Additionally, the spring clips on the rods are vertically adjustable so that the line of sight, or horizon, of the scene can be vertically adjusted relative to the foreground figure model. Once these adjustments are made to the satisfaction of the student, additional art objects or figure models are attached to the elastic cords to complete the three dimensional scene. A transparent grid is provided at the front of the apparatus so that the art student views the scene composed through the grid. This grid provides assistance and instruction to the student in the technique of proportioning the objects he reproduces. The entire apparatus as described is designed to be readily disassembled. All art objects are readily separated from the apparatus, the vertical rods providing attachment points for the elastic cords are detachable from the apparatus, and the transparent grid is removable from its holder. This disassembly allows the art instructing apparatus to be conveniently and compactly packed for transport by the user.

DESCRIPTION OF THE DRAWINGS

The instant invention can be best understood by reference to the following description of a preferred embodiment taken in conjunction with the accompanying drawings in which.

DESCRIPTION OF THE PREFERRED EMBODIMENT

Figure 1:
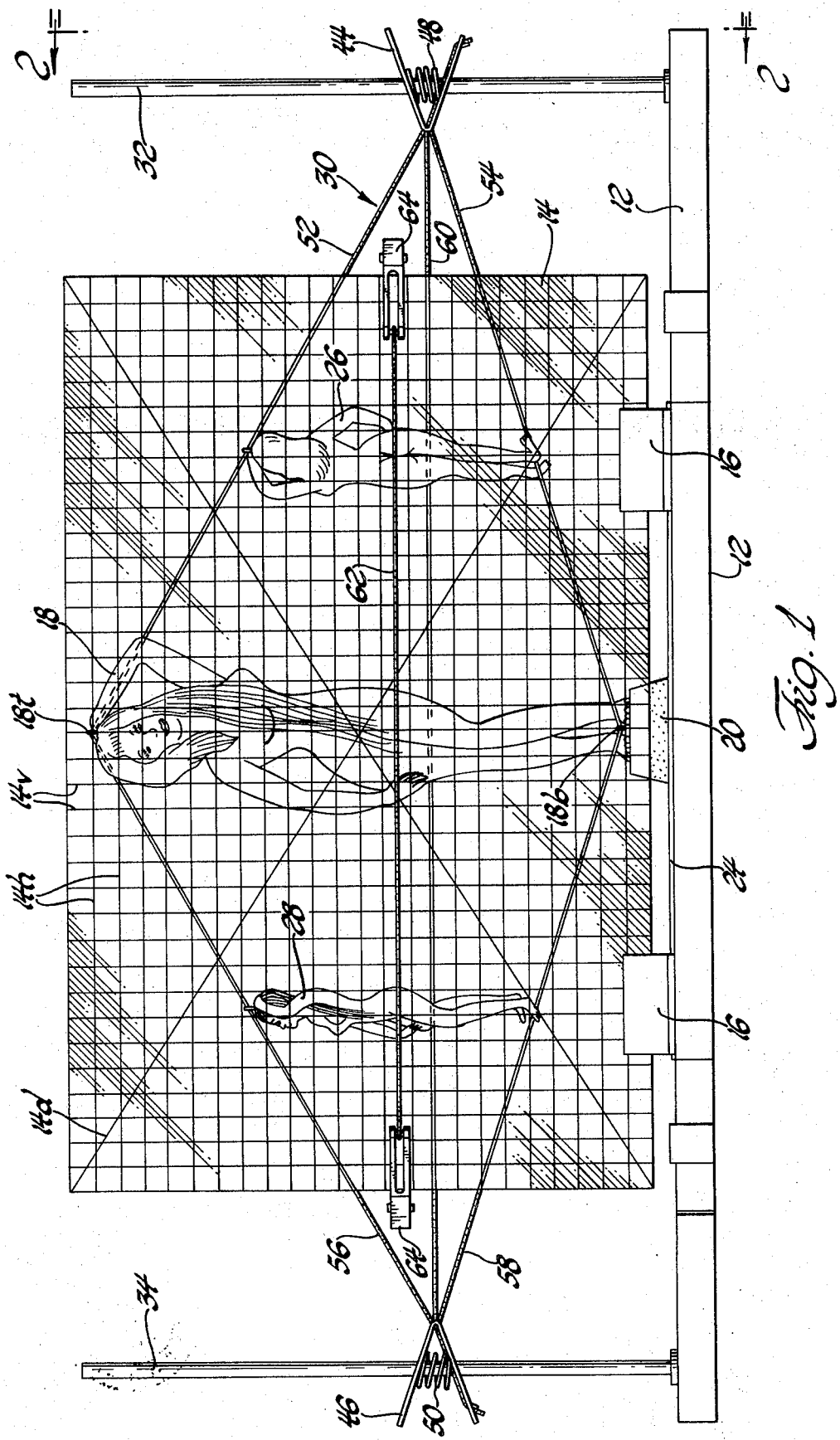
FIG. 1 is a front elevation view of the art instructing apparatus of the present invention.
Figure 2:
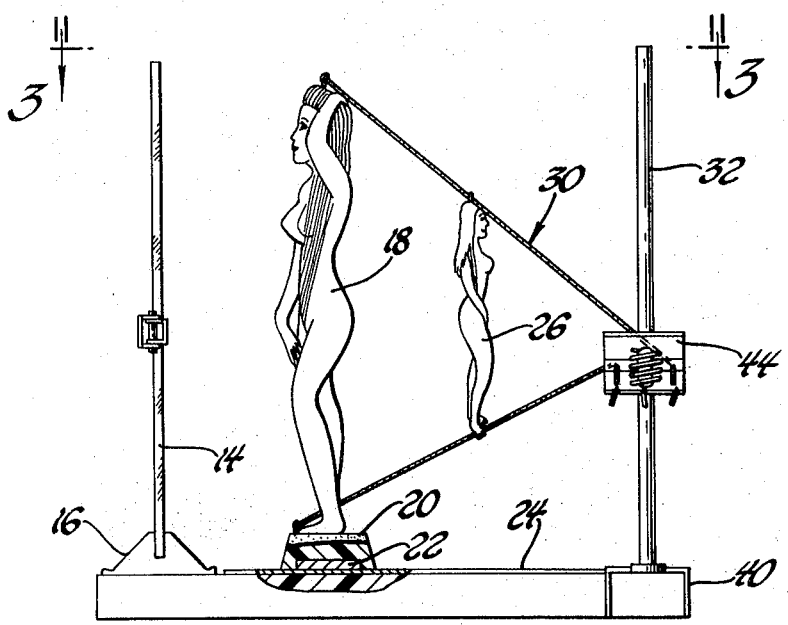
FIG. 2 is a side elevation view of the art instructing apparatus.

Reference should now be made to the drawings and more particularly to FIG. 1 wherein the art instructing apparatus of the present invention, generally designated 10, is illustrated. The apparatus 10 includes a base member 12 and a transparent grid 14 carried in slotted brackets 16 mounted on the base member 12. The brackets 16, which are best illustrated in FIG. 2, can be attached to the base member 12 by any suitable means, such as adhesives or fasteners. The brackets 16 position the transparent grid 14 such that it is disposed substantially perpendicularly to the base member 12 as illustrated in FIG. 2. The grid 14 is provided with a plurality of horizontal lines 14H, a plurality of vertical lines 14V, and diagonal lines 14D to assist the student in establishing proper proportions. Preferably the student makes his two dimensional reproduction on paper having correlative grid lines.

A foreground art object comprising a female figure model 18 is adapted to be selectively positioned on the base member 12. The figure model 18 stands on a pedestal 20 which includes a magnetic portion comprising a magnet 22 as shown in FIG. 2. The base member 12 includes a ferromagnetic portion or overlay 24 up-on which the figure model 18 is positioned and to which the magnet 22 secures the figure model 18 once positioned. The figure model 18 can be attached to the pedestal 20 by any suitable means, or the pedestal 20 can be integral with the figure model 18. The magnet 22 is secured in the pedestal 20 in a conventional manner; similarly, the ferromagnetic overlay 24 can be secured to the base member 12 by any suitable means. Various alternative mounting arrangements are known by which the figure model 18 can be selectively mounted on the base member 12. For example the figure model 18 could be provided with a peg on its base and the base member 12 with one or a plurality of holes into which the peg would be inserted to secure the figure model 18 to the base member 12.

A background art object comprising a figure model 26 provides, in combination with the figure model 18, a three dimensional scene in the art instructing apparatus. A second background art object comprising a figure model 28 further develops the three dimensional scene of the apparatus. A perspective means generally designated 30 is coupled with the figure model 26 such that the figure model 26 can be positioned with respect to the figure model 18 to simulate various perspective scenes involving both the figure model 18 and the figure model 26. The figure model 28 is also coupled with the perspective means 30 such that it too can be controllably positioned with respect to the figure model 18.

Figure 3:
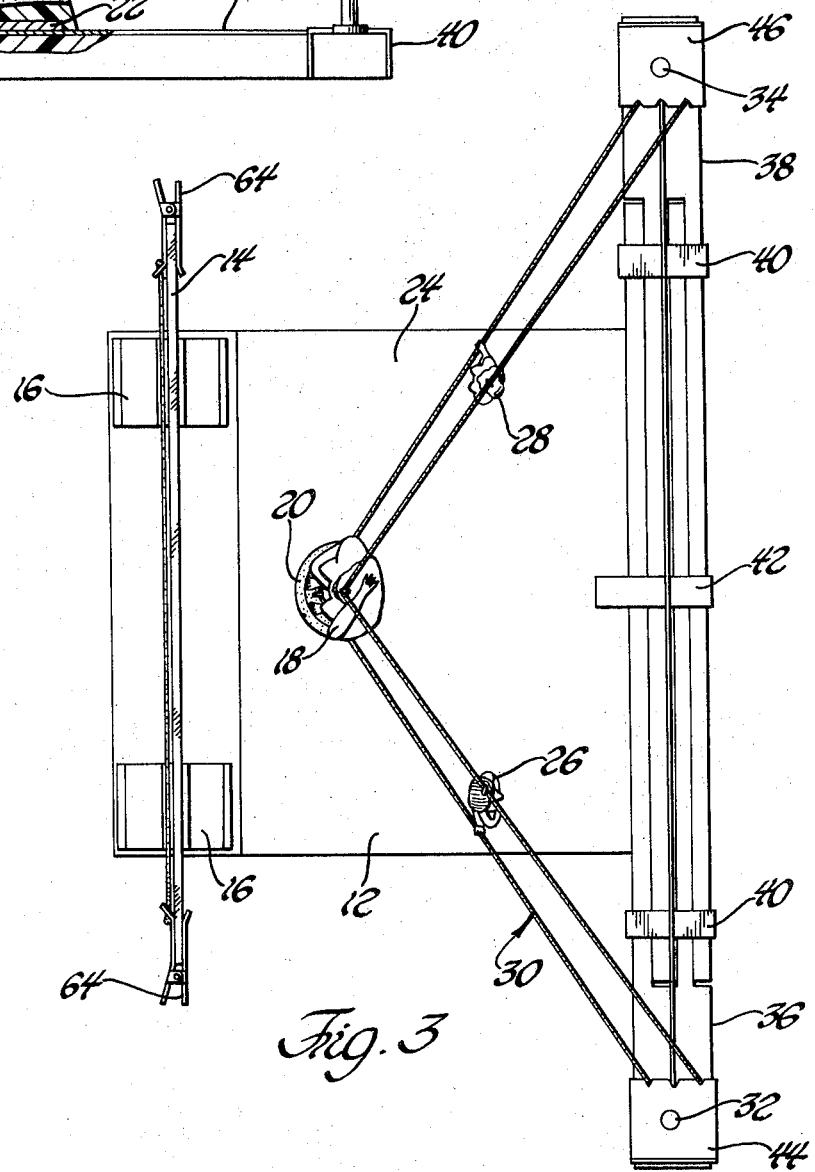
FIG. 3 is a top plan view of the art instructing apparatus.

The perspective means 30 comprises first and second vertical rods 32 and 34 disposed perpendicularly to the base member 12. The rods 32 and 34 are mounted in extensible members 36 and 38, best illustrated in FIG. 3, such that the horizontal separation of the rods 32 and 34 can be adjusted. The extensible members 36 and 38 are interleaved sliding members banded together by bands 40. A band 42, attached to the base member 12, secures the members 36 and 38 to the base member 12.

Spring clips 44 and 46, including respectively coil springs 48 and 50, are slidably carried by the rods 32 and 34. Two elastic cords are fastened, for example by tying, to each of the spring clips 44 and 46. One cord from each spring clip is fastened to the top of the figure model 18 at an eyelet 18T, and one cord from each spring clip is fastened to the bottom of the figure model 18 at an eyelet 18B. An elastic cord 52 extends from the spring clip 44 to the top of the figure model 18; an elastic cord 54 extends from the spring clip 44 to the bottom of the figure model 18; an elastic cord 56 extends from the spring clip 46 to the top of the figure model 18; and an elastic cord 58 extends from the spring clip 46 to the bottom of the figure model 18.

The connections of the elastic cords 52, 54, 56 and 58 with the spring clips 44 and 46 represent the vanishing points of the perspective lines of the three dimensional scene. The vertical positions of these vanishing points can be adjusted by vertically adjusting the spring clips 44 and 46; the horizontal positions of these vanishing points can be adjusted by adjusting the extensible members 36 and 38 which carry the rods 32 and 34. Figure models 26 and 28 are attached to the elastic cords at positions determined by the rate at which the perspective lines recede from foreground to background; accordingly, adjustments of the positions of the vanishing points will require corresponding adjustments in the positions of the figure models 26 and 28.

The art instructing apparatus 10 is designed for easy disassembly for compact packing. The grid 14 slides from the brackets 16; the rods 32 and 34 can be threaded in the extensible members 36 and 38 or retained by friction to permit removal; and the figure models 18, 26, and 28 are all readily separated from the apparatus. The horizon of the scene is defined by an elastic cord 60 attached to the spring clips 44 and 46. Prior to disassembling the apparatus, the horizon line can be marked as a reference to facilitate reconstructing the scene as it existed prior to disassembly. For this purpose, a reference elastic cord 62 attached to the grid 14 by two clips 64 is provided to be aligned with the horizon line 60 prior to disassembly. Thus, it is seen that the apparatus can be disassembled although the reproduction of the scene is not complete, and the same scene can be reconstituted to permit completion of the reproduction.

Although the foregoing has proceeded in terms of a particular preferred embodiment, it is to be understood that various modifications and changes could be engrafted thereon by one skilled in the art within the spirit and scope of the appended claims.

The embodiments of the invention in which an exclusive property or privilege is claimed are defined as follows:

1. An art instructing apparatus comprising: a base member; a transparent grid carried by said base member and disposed substantially perpendicularly to said base member; a foreground art object positioned on said base member; a background art object; and perspective means coupled with said background art object for positioning said background art object with respect to said foreground art object to simulate various perspective scenes involving both said foreground art object and said background art object.

2. An apparatus as in claim 1 wherein said means for positioning said background art object includes means for controlling the angle at which the scene comprising said foreground art object and said background art object recedes to the horizon.

3. An apparatus as in claim 1 wherein said means for positioning said background art object includes means for controllably positioning the horizon in the scene comprising said foreground art object and said background art object.

4. An apparatus as in claim 3 wherein said foreground art object is adapted to be selectively positioned on said base member.

5. An apparatus as in claim 4 wherein said base member includes a ferromagnetic portion and wherein said foreground art object includes a pedestal having a magnetic portion whereby said foreground art object can be selectively positioned on said base member.

6. An apparatus as in claim 5 wherein said foreground art object comprises a figure model.

7. An apparatus as in claim 1 wherein said perspective means includes a rod disposed perpendicularly to said base member and a cord interconnecting said rod with said foreground art object.

8. An apparatus as in claim 1 wherein said perspective means includes first and second rods disposed perpendicularly to said base member and a plurality of cords interconnecting said rods with said foreground art object.

9. An apparatus as in claim 8 wherein said cords are elastic cords.

10. An apparatus as in claim 9 including spring clips on said rods by which said elastic cords are secured to said rods.

11. An apparatus as in claim 10 wherein said spring clips are vertically adjustable on said rods.

12. An apparatus as in claim 11 wherein the separation between said rods is adjustable.

13. An apparatus as in claim 12 wherein said transparent grid is disposed substantially at the front edge of said base member.

14. An apparatus as in claim 13 wherein said transparent grid is disposed within mounting brackets.

15. An apparatus as in claim 14 wherein said grid includes diagonal lines.

16. An apparatus as in claim 15 including an adjustable horizontal reference marker carried by said grid.

17. An apparatus as in claim 16 wherein said adjustable horizontal reference marker comprises first and second clips and a cord.

18. An apparatus as in claim 14 wherein said transparent grid, said foreground art object, said background art object and said first and second rods are adapted to be disassembled for compact packaging.

* * * * *